US006753622B2

(12) United States Patent
Oughton, Jr.

(10) Patent No.: US 6,753,622 B2
(45) Date of Patent: Jun. 22, 2004

(54) UNINTERRUPTIBLE POWER SUPPLY SYSTEMS AND METHODS USING RECTIFIED AC WITH CURRENT CONTROL

(75) Inventor: George W. Oughton, Jr., Raleigh, NC (US)

(73) Assignee: Powerware Corporation, Raleigh, NC (US)

( * ) Notice: Subject to any disclaimer, the term of this patent is extended or adjusted under 35 U.S.C. 154(b) by 482 days.

(21) Appl. No.: 09/798,409

(22) Filed: Mar. 2, 2001

(65) Prior Publication Data

US 2002/0122322 A1 Sep. 5, 2002

(51) Int. Cl.[7] .................................................. H02J 7/00
(52) U.S. Cl. ........................................................ 307/64
(58) Field of Search ............................. 307/64, 66, 125, 307/128, 130, 131; 363/65, 67, 69, 70

(56) References Cited

U.S. PATENT DOCUMENTS

| | | | |
|---|---|---|---|
| 5,289,046 A | 2/1994 | Gregorich et al. | 307/66 |
| 6,122,181 A | 9/2000 | Oughton, Jr. | 363/37 |
| 6,169,669 B1 | 1/2001 | Choudhury | 363/37 |
| 6,181,029 B1 | 1/2001 | Berglund et al. | 307/66 |
| 6,208,529 B1 * | 3/2001 | Davidson | 363/17 |
| 6,430,068 B1 * | 8/2002 | Sadler et al. | 363/65 |
| 6,504,266 B1 * | 1/2003 | Ervin | 307/29 |

FOREIGN PATENT DOCUMENTS

EP       0599 814     6/1994

OTHER PUBLICATIONS

Alvarez–Barcia et al., "Low Power AC/DC On–Board Converters for Rectified ac Power Distribution Demonstrator for Telecommunication," IEEE APEC 2000 Conference Proceedings, 2000, pp. 1177–1182.

Marquet et al., "New Power Supply Optimised for New Telecom Networks and Services," IEEE INTELEC '99 Conference Proceedings, 1999, 8 pages.

(List continued on next page.)

Primary Examiner—Gregory J. Toatley, Jr.
(74) Attorney, Agent, or Firm—Myers Bigel Sibley & Sajovec (57) ABSTRACT

An uninterruptible power supply (UPS) system includes an AC input port, a DC input port, and an output port configured to be connected to an AC load. A rectifier circuit is coupled to the AC input port, and a power transfer control circuit is coupled to the rectifier circuit output, the DC input port and the output port. The power transfer control circuit produces a DC voltage at the AC load from a rectified voltage produced by the rectifier circuit in a first mode of operation and from a DC voltage at the DC input port in a second mode of operation. A current control circuit, e.g., a boost regulator, may control a current from at least one of the rectifier circuit and the DC input port responsive to a control input. A DC/DC converter circuit may be coupled between the DC input port and the output port.

64 Claims, 8 Drawing Sheets

OTHER PUBLICATIONS

Gonzalez et al., "New Approach to the rAC Powering Architecture for Telecom/Datacom Convergence," ALCATEL Corporate Resarch Center, Madrid, Spain, no date, 8 pages.

Yamashita et al., "270 V DC System—A Highly Efficient and Reliable Power Supply System for Both Telecom and Datacom Systems," IEEE INTELEC '99 Conference Proceedings, 1999, 6 pages.

Garcia et al., "Harmonic Reducer Converter," IEEE DESC 2000 Conference Proceedings, 2000, pp. 583–587.

Vazquez et al., "A Systematic Approach to Select Distributed, Centralised or Mixed Power Architecture in Telecom Applications," IEEE INTELEC '99 Conference Proceedings, 1999, pp. 129–136.

Dalarsson, Nils, "Trends in Telecommunications Networks and their Effects on Power Systems," IEEE INTELEC '99 Conference Proceedings, 1999, pp. 8–14.

de la Cruz et al., "Alimentación distribuida: una alternativa de bajo coste y altas prestaciones para nuevos equipos de Acceso," Telecom I+D 97 (Alcatel), pp. 423–428.

Jugan et al., "Powering architecutures for new needs in telecommunications," INTELEC '95, Seventeenth International Telecommunications Energy Conference, Oct. 29–Nov. 1, 1995, Netherlands Congress Centre, The Hague, The Netherlands, (France Telecom), pp. 196–202.

\* cited by examiner

UNINTERRUPTIBLE POWER SUPPLY SYSTEMS AND METHODS USING RECTIFIED AC WITH CURRENT CONTROL

FIELD OF THE INVENTION

This invention relates to power supplies and power supply methods and more particularly to systems and methods for producing uninterruptible power.

BACKGROUND OF THE INVENTION

Uninterruptible Power Supplies (UPS) are widely used to provide power to electronic components in the event that the alternating current (AC) utility input voltage fails. UPSs are now widely used, for example with computers, including but not limited to personal computers, workstations, and mainframe computers, to insure that valuable data is not lost and that the computer can continue to operate notwithstanding temporary loss of the AC utility input voltage. There are a variety of different types of UPSs, including on-line and standby UPSs. Each of these types has its attendant advantages and disadvantages. Consequently, the selection of an appropriate type of UPS for a particular application generally depends on the nature of the application, e.g., the voltage regulation, current capacity, cost and reliability desired.

U.S. Pat. No. 6,122,181 to Oughton, Jr. describes systems and methods for producing standby uninterruptible power for an AC load that rectify an AC utility input voltage to produce a rectified voltage and that activate a DC battery voltage in response to a predetermined change in the AC utility input voltage to thereby produce a standby DC voltage. The rectified voltage and the standby DC voltage are connected to an AC load that is also capable of operating on DC power, such as an AC load that includes input rectification, to thereby produce standby uninterruptible power without the need for potentially costly, bulky, and/or unreliable inverters or converters.

U.S. Pat. No. 6,181,029 to Berglund et al. describes a power system that includes a battery back-up unit (BBU) that provides battery back up support for a plurality of power supplies that include respective input rectifiers in combination with a respective boost stage that provides power factor correction. The outputs of the boost stages are monitored to control application of power to the power supplies by the BBU from an AC source and a battery.

"New Power Supply Optimised for New Telecom Networks and Services," by Marquet et al., *IEEE INTELEC '99 Conference Proceedings* (1999), and "New Approach to the rAC Powering Architecture for Telecom/Datacom Convergence," by Gonzalez et al., *IEEE INTELEC 2000 Conference Proceedings* (2000), describe power distribution systems in which AC mains voltage is rectified at the input of telecommunications equipment and distributed directly to AC/DC converters, such as centralized AC/DC converters and AC/DC converter modules on boards that include other functional circuitry, e.g., computer power supply boards. When a mains failure occurs, backup is provided by a high voltage battery connecting at the input of the centralized AC/DC converters and/or to the on-board modules. An off-line AC/DC converter may be used to charge the battery. Power factor correction may be implemented in a distributed fashion or may be implemented in the form of a centralized power factor converter placed in parallel with the rectifier.

Although the aforementioned techniques can effectively provide standby power, there is an ongoing need for improved systems and methods for providing reliable power.

SUMMARY OF THE INVENTION

According to embodiments of the invention, an uninterruptible power supply (UPS) system includes an AC input port configured to be connected to an AC power source, a DC input port configured to be connected to a DC power source and an output port configured to be connected to an AC load. The system further includes a rectifier circuit coupled to the AC input port, and a power transfer control circuit coupled to the rectifier circuit output, the DC input port and the output port. The power transfer control circuit is operative to produce a DC voltage at the output port from a rectified voltage produced by the rectifier circuit in a first mode of operation and to produce a DC voltage at the output port from a DC voltage at the DC input port in a second mode of operation. The power transfer control circuit includes a current control circuit configured to be coupled between the output port and at least one of the rectifier circuit and the DC input port and operative to control a current from at least one of the rectifier circuit and the DC input port responsive to a control input. The power transfer control circuit also includes a switching circuit operative to couple and decouple the DC input port to and from the output port.

In some embodiments of the invention, the current control circuit is operative to control a power factor and/or harmonic current at the AC input port responsive to the control input. For example, the current control circuit may comprise a power factor correcting boost regulator circuit series-coupled between the rectifier circuit and the output port. The current control circuit may also be operative to regulate a voltage at the output port responsive to the control input.

In other embodiments of the invention, the power transfer control circuit further comprises a DC/DC converter circuit coupled between the DC input port and the output port. The DC/DC converter circuit may be operative to generate a boosted DC voltage at the output port from a DC voltage at the DC input port in the second mode of operation, and may provide galvanic, e.g., transformer, isolation between the DC input port and the output port in the second mode of operation.

In other embodiments of the invention, a UPS system includes an AC input port configured to be connected to an AC power source, a DC input port configured to be connected to a DC power source, and an output port configured to be connected to an AC load. The UPS system further includes a rectifier circuit coupled to the AC input port and a switching circuit operative to couple and decouple the DC port to and from the output port responsive to a first control input. A power factor correction circuit is configured to connect the rectifier circuit to the output port and operative to control a power factor at the input port responsive to a second control input.

In still other embodiments of the invention, a UPS system includes an AC input port configured to be connected to an AC power source, a DC input port configured to be connected to a DC power source and an output port configured to be connected to an AC load. The system further includes a rectifier circuit having an input coupled to the AC input port and an output coupled to the output port. A power transfer control circuit is coupled to the rectifier circuit output, the DC input port and the output port. The power transfer control circuit is operative to produce a DC voltage at the output port from a rectified voltage produced by the rectifier circuit in a first mode of operation and to produce a DC voltage at the output port from a DC voltage at the DC input port in a second mode of operation. The power transfer control circuit includes a DC/DC converter circuit configured to be coupled between the DC input port and the output port, e.g., a combination of a forward converter circuit and a switching circuit operative to couple and decouple the forward converter circuit to and from the output port.

In additional embodiments of the invention, an uninterruptible power supply system includes a plurality of UPS subsystems in a ganged, e.g., parallel-connected, configuration. Each of the UPS subsystems includes an AC input port, a DC input port and an output port. A rectifier circuit is coupled to the AC input port and a power transfer control circuit is coupled to the rectifier circuit output, the DC input port and the output port. The power transfer control circuit is operative to produce a DC voltage at the output port from a rectified voltage produced by the rectifier circuit in a first mode of operation and to produce a DC voltage at the output port from a DC voltage at the DC input port in a second mode of operation. The plurality of UPS subsystems are configured to be connected in common at their output ports to a load including at least one AC load. A power transfer control circuit may include a current control circuit configured to be connected between the output port and at least one of the rectifier circuit and the DC input port and operative to control a current from the at least one of the rectifier circuit and the DC input port responsive to a control input.

In method embodiments of the invention, power is supplied to an AC load by applying an AC voltage to a rectifier circuit to produce a rectified voltage and controlling a current from the rectifier circuit while producing a DC voltage at the AC load from the rectified voltage. A DC power source is then coupled to the AC load to produce a DC voltage at the AC load from the DC power source. The DC power source may be decoupled from the AC load concurrent with the step of controlling a current from the rectifier circuit while producing an AC voltage at the AC load from the rectified voltage.

In other method embodiments of the invention, power is supplied to an AC load by applying an AC voltage to a rectifier circuit to produce a rectified voltage. A DC voltage is applied to a DC IDC converter circuit to produce a converted DC voltage. A DC voltage is produced at the AC load from the rectified voltage, and then a DC voltage is produced at the AC load from the converted DC voltage.

UPS systems and methods according to embodiments of the invention can provide one or more advantages. Using a current control circuit to control power factor can allow a UPS system to correct power factor associated with AC loads, such as low complexity power supplies, that lack integral power factor correction capability. In ganged operation, UPS systems according to embodiments of the invention can provide desirable output voltage and current characteristics that facilitate power sharing. Using a DC/DC converter to provide standby DC power can allow DC power to be obtained from sources that might otherwise be incompatible, such as 48 V positive-grounded telecommunications power supplies.

DETAILED DESCRIPTION

The invention now will be described more fully with reference to the accompanying drawings, in which specific embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 1:
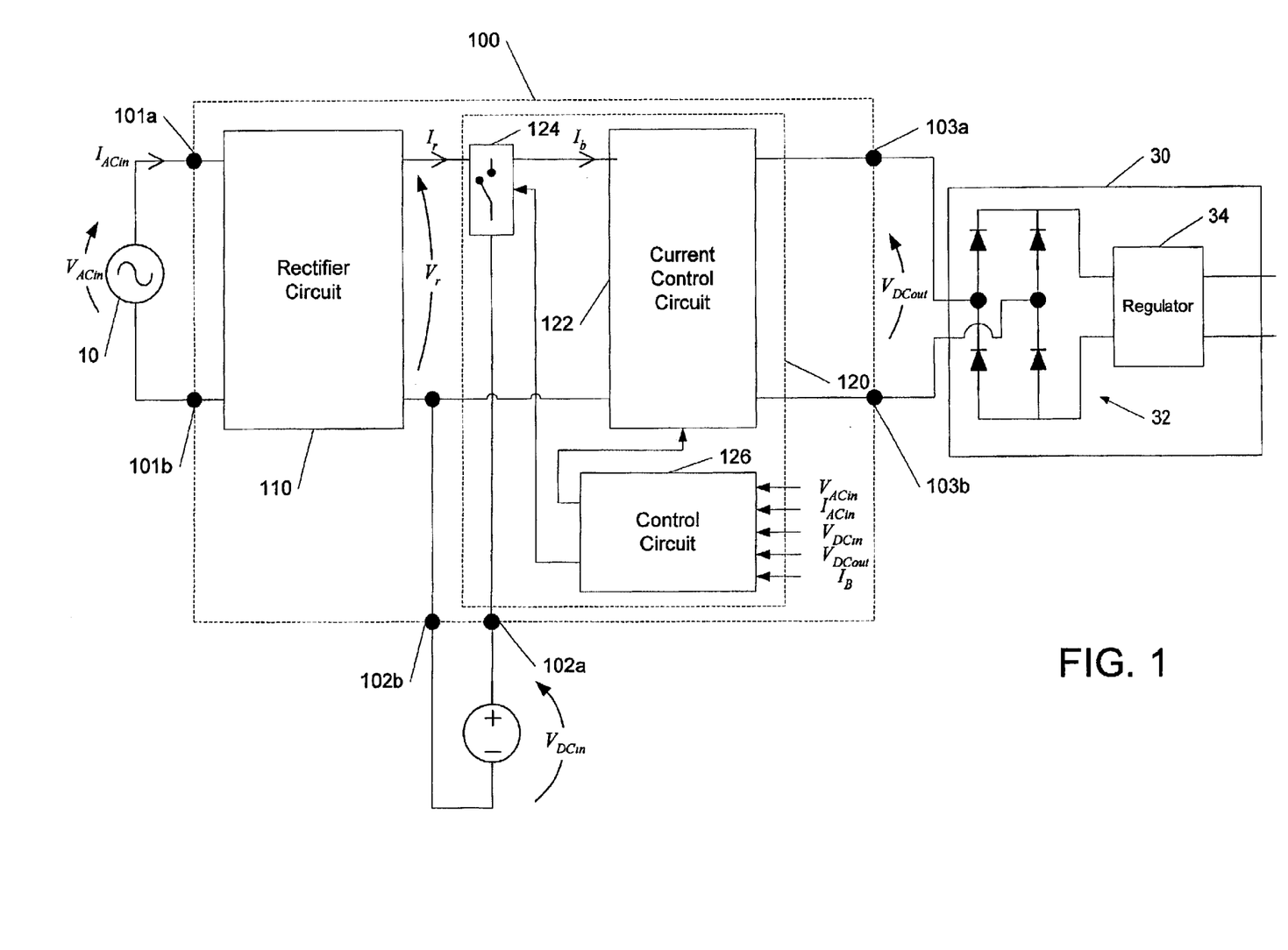
FIG. 1 is a schematic diagram illustrating a UPS system and methods according to embodiments of the invention.

FIG. 1 illustrates a UPS system and methods 100 according to embodiments of the invention. The system 100 includes a rectifier circuit 110 having its input coupled to an AC input port 101a, 101b. The AC input port 101a, 101b is configured to be connected to an AC power source 10, such as an AC utility line, that produces an AC voltage $V_{ACin}$. The rectifier circuit 110 is operative to produce a rectifier voltage $V_r$ at its output from the AC input voltage $V_{ACin}$. The system 100 further includes a DC input port 102a, 102b that is configured to connect to a DC power source 20 that produces a DC input voltage $V_{DCin}$. The DC power source 20 may include, but is not limited to, an electrochemical cell or other type of battery, a DC power supply such as may be used in telecommunications or other applications, or a motor/generator or other electromechanical apparatus that produces a DC power.

The system 100 further includes a power transfer control circuit 120 that is coupled to the DC input port 102a, 102b and the output of the rectifier circuit 110. The power transfer control circuit 120 produces a DC output voltage $V_{DCout}$ at a DC output port 103a, 103b from respective ones of the rectified voltage $V_r$ and the DC input voltage $V_{DCin}$ in respective first and second modes of operation, e.g., a normal mode when the AC input voltage $V_{ACin}$ meets a predetermined criterion and an emergency mode when the AC input voltage $V_{ACin}$ fails to meet the predetermined criterion.

The DC output port 103a, 103b is configured to connect to an AC load, in particular, an AC load that is operable to be powered from a DC voltage, such as an AC load including input rectification. For example, as shown in FIG. 1, the AC load 34 may include a input rectifier 32 and downstream regulator 34, as commonly found in AC-powered power supplies, e.g., other UPSs, DC power supplies or power supply modules included in devices such as computers, telecommunications devices or networking devices.

The power transfer control circuit 120 includes a current control circuit 122 that controls a current $I_r$ from the rectifier circuit 110. The power transfer control circuit 120 further includes a switching circuit 124 operative to couple and decouple the DC input port 102a, 102b to and from the input of the current control circuit 122. As shown, the power transfer control circuit 120 includes a control circuit 126 that controls the current control circuit 122 and the switching circuit 124 responsive to a control input, such as the AC input voltage $V_{ACin}$, the input AC current $I_{ACin}$, the DC input voltage $V_{DCin}$, the DC output voltage $V_{DCout}$, the current $I_b$ input into the current control circuit 122, or combinations thereof.

The rectifier circuit 110 may comprise a variety of different types of circuits capable of rectifying an AC voltage to produce a rectified voltage. The rectifier circuit 110 may include, but is not limited to, passive diode networks and active switched networks that achieve such rectification. The rectifier circuit 110 may perform half-wave, full-wave, multi-phase and other types of rectification. The rectifier circuit 110 may include switching devices, such as diodes or other solid state switching devices, as well as other circuitry, including processing circuitry the executes instructions in the form of computer software or firmware, that control such switching devices.

The power transfer control circuit 120 may similarly include switching devices and associated control circuitry. For example, the switching circuit 124 may be implemented using devices such as electromechanical relays and/or solid state devices, such as transistors, silicon controlled rectifiers, diodes, diode networks, or the like, that provide similar switching functionality. The current control circuit 122 may include similar types of devices, as well as passive devices, such as inductors and capacitors, that provide desired circuit characteristics. The control circuit 126 may comprise any of a number of different types of circuits capable of generating appropriate signals for controlling the devices of the current control circuit 122 and the switching circuit 122.

The power transfer control circuit 120 is responsive to a control input to couple and decouple the DC input port 102a, 102b to and from the input of the current control circuit 122 and, thus, from the output port 103a, 103b. For example, in a first, AC-powered mode of operation, the power transfer control circuit 120 may decouple the DC input port 102a, 102b from the input of the current control circuit 122 as long as the AC input voltage $V_{ACin}$ meets a predetermined criterion, e.g., a line voltage or other criteria. In response to a subsequent failure to meet this criterion, the power transfer control circuit 120 may decouple (e.g., by opening a switch or blocking current through reverse biasing of a diode) the rectifier circuit 110 from the current control circuit 122 and couple the DC input port 102a, 102b to the current control circuit 122, thus placing the system 100 in a second, DC-powered mode of operation. It will be appreciated that such a transfer may be accomplished in a number of different ways. It will be further appreciated that if, for example, the DC source 20 is a battery, a separate charging circuit may be provided and/or charging current for the battery may be provided from the output of the rectifier circuit 110 via the switching circuit 124, which may include additional circuitry (not shown) that performs charge current regulation and other functions.

Figure 2:
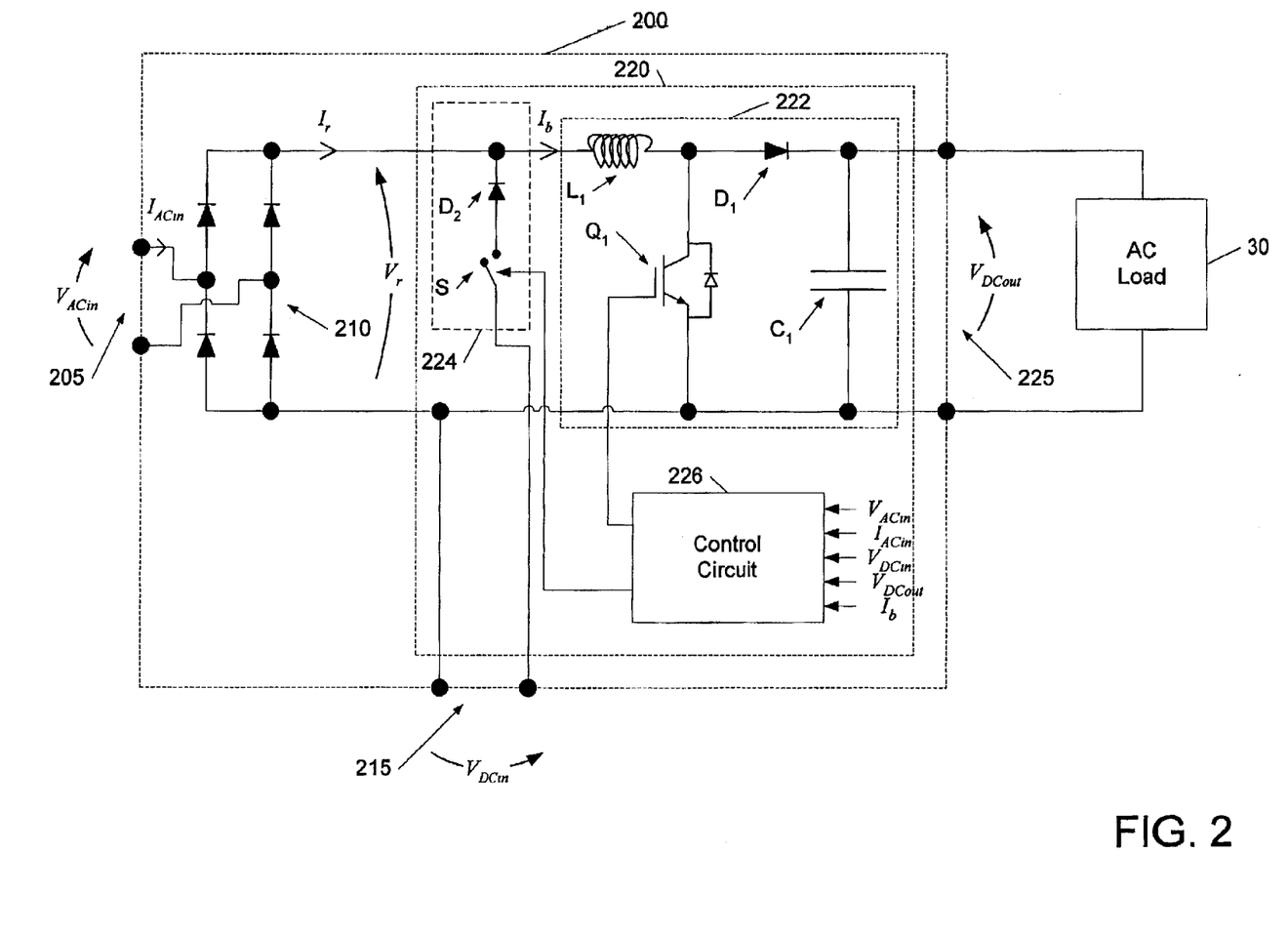
FIG. 2 is a schematic diagram illustrating a UPS system and methods utilizing a boost regulator circuit according to embodiments of the invention.

According to various aspects of the invention, a current control circuit such as the current control circuit 122 of FIG. 1 may be used to control circuit operational characteristics, such as a power factor, harmonic current or other voltage or current characteristics at the AC input port 101a, 101b and/or the magnitude of the DC output voltage $V_{DCout}$ at the DC output port 103a, 103b. For example, as shown in FIG. 2, a UPS system 200 according to embodiments of the invention may include a current control circuit in the form of a boost regulator circuit 222 that may be used to control power factor and/or harmonics at an input port 205 and/or to regulate a DC output voltage $V_{DCout}$ at an output port 225 that is configured to be coupled to an AC load 30.

The UPS system 200 includes a rectifier circuit, here shown as a full-wave rectifying diode bridge 210 coupled to an AC input port 205, which is configured to connect to an AC power source (not shown). The UPS system 200 further includes a DC input port 215 configured to be connected to a DC power source (not shown). The system 200 includes a power transfer control circuit 220 that is operative to produce a DC output voltage $V_{DCout}$ at an output port 225 of the system 200 from respective ones of a rectified voltage $V_r$ produced by the rectifier circuit 210 and a DC input voltage $V_{DCin}$ at the DC input port 215 in respective first and second modes of operation. The power transfer control circuit 220 includes a switching circuit 224 and the boost regulator circuit 222. The boost regulator circuit 222 is controlled by a control circuit 226 responsive to a control input, such as the AC input voltage $V_{ACin}$ at the AC input port 205, the AC input current $I_{ACin}$, the DC input voltage $V_{DCin}$, the DC output voltage $V_{DCout}$, the current $I_b$ into the boost regulator circuit 222, or combinations thereof. The boost regulator circuit 222 includes an inductor $L_1$, a switching transistor $Q_1$, here shown as an insulated gate bipolar transistor (IGBT), a blocking diode $D_1$, and a storage/filter capacitor $C_1$.

When the system 200 is in an AC-powered mode of operation, the boost regulator circuit 222 may be used to provide power factor correction at the AC input port 205. More particularly, the control circuit 226 may modulate the transistor $Q_1$ responsive to the AC input voltage $V_{ACin}$ and the AC input current $I_{ACin}$ such that a desired degree of agreement between the voltage and current waveforms may be achieved. The boost regulator circuit 222 may also be operated while in an AC powered mode to provide voltage regulation at the output port 225 responsive to, for example, the DC output voltage $V_{DCout}$ and/or the AC input voltage $V_{ACin}$. For example, the control circuit 226 may modulate the transistor $Q_1$ to boost the output voltage $V_{DCout}$ with respect to the rectified voltage $V_r$. In this manner, the boost regulator circuit 222 may compensate for variation in the magnitude of the AC input voltage $V_{ACin}$ and/or changes in the AC load 30. In a DC-powered mode of operation, the boost regulator circuit 222 may be also be used to provide voltage regulation at the AC load 30, enabling the system 200 to compensate, for example, for changes in the DC input voltage $V_{DCin}$. The boost regulator circuit 222 can also be used to generate the DC output voltage $V_{DCout}$ from a relatively low DC input voltage $V_{DCin}$, as might be provided by a low-voltage battery.

As shown, the switching circuit 224 includes a switch S that is diode OR'ed to the output of the rectifier circuit 210 using a diode D2. When the switch S is closed to power the boost regulator circuit 222 from the DC input port 215, the diode $D_2$ can prevent current flow from the rectifier circuit to the DC input port 215. In this manner, a seamless transition between operation using the DC input port 215 to operation using the rectifier circuit 210 can be achieved. It will be appreciated, however, that other transfer techniques may be used with the invention.

Figure 3:
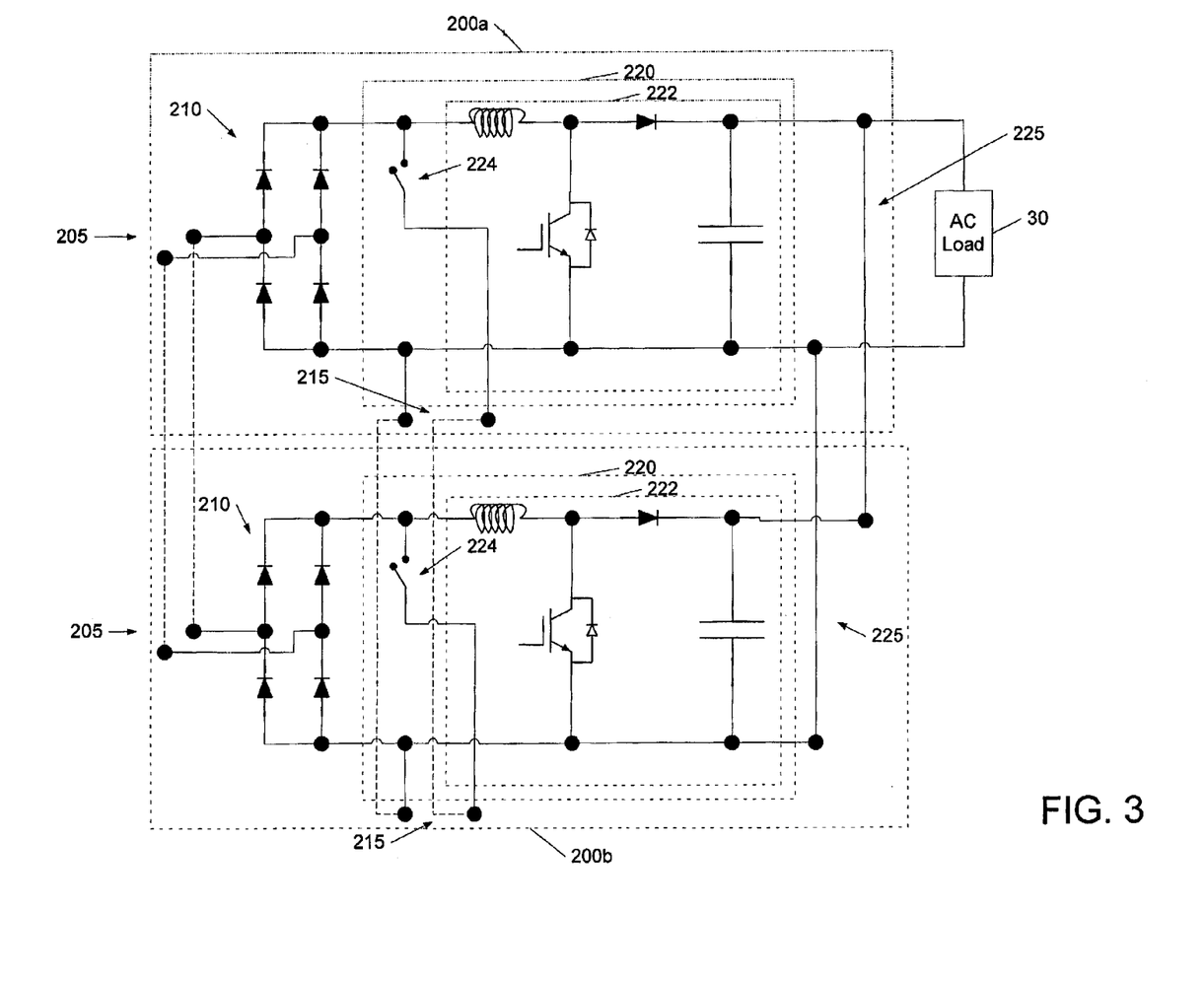
FIG. 3 is a schematic diagram illustrating a UPS system and methods utilizing multiple UPS subsystems according to embodiments of the invention.

FIG. 3 illustrates another advantageous use of UPS systems according to embodiments of the invention. A UPS system 300 includes multiple, parallel-connected UPS subsystems 200a, 200b which include components as described above with reference to FIG. 2. Like components of the UPS system 200 of FIG. 2 and the UPS subsystems 200a, 200b of FIG. 3 are indicated by like reference numerals, and detailed discussion of these components will be omitted here in light of the foregoing description of FIG. 2. In FIG. 3, some components of the UPS subsystems 200a, 220b corresponding to components of the UPS system 200 of FIG. 2 are not shown for purposes of clarity.

As shown, the respective UPS subsystems 200a, 200b include respective AC input ports 205 that are configured to be coupled to one or more AC power sources (not shown), with dashed lines indicating that the AC input ports 205 may be coupled in common to an AC source. The respective UPS subsystems 200a, 200b also include respective DC input ports 215 that are configured to be coupled to one or more DC sources (not shown), with dashed lines indicating that the DC input ports 215 may be coupled in common to a DC source. The respective UPS subsystems 200a, 200b further include respective output ports 225 that are coupled in common to an AC load 30. UPS subsystems according to the invention may also be connected as shown in FIG. 3 to provide redundancy in serving the AC load 30. For example, the subsystems 200a, 200b may be sized such that N+1 redundancy is provided.

Figure 4:
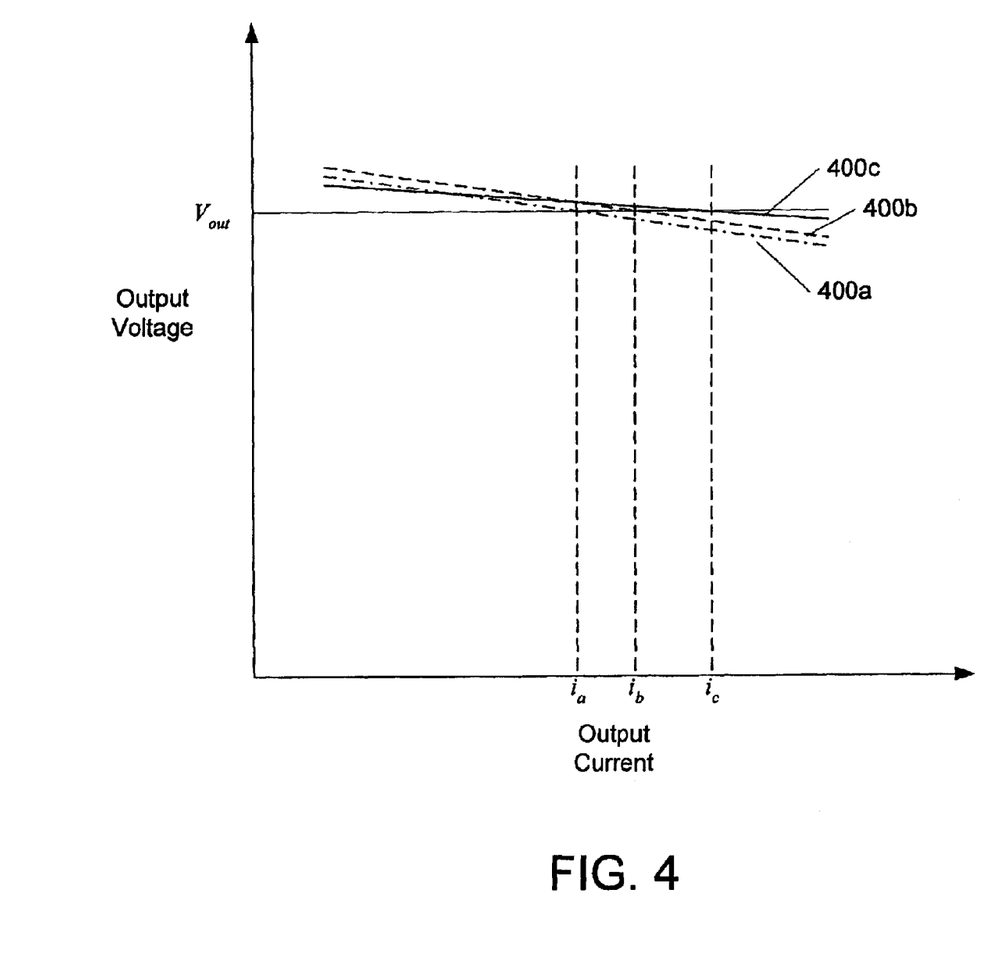
FIG. 4 is a diagram illustrating exemplary voltage vs. current relationships for parallel-connected UPS subsystems according to embodiments of the invention.

As shown, the UPS subsystems 200a, 200b include respective boost regulator circuits 222 that may operate as described above with reference to FIG. 2. In embodiments of the invention, such boost regulator circuits may be advantageously used to provide desirable current sharing characteristics. In FIG. 4, for example, boost regulator circuits (or other output-regulating circuits) of three parallel-connected UPS subsystems may be configured to provide respective sloped output current vs. voltage characteristics 400a, 400b, 400c. Configuring the UPS subsystems to produce the sloped characteristics 400a, 400b, 400c can produce a more desirable balance among the currents $i_a$, $i_b$, $i_c$ drawn from the respective UPS subsystems than if, for example, the characteristics 400a, 400b, 400c are relatively flat. In this manner, the likelihood that any particular one of the UPS subsystems experiences over- or under-loading may be reduced.

Figure 5:
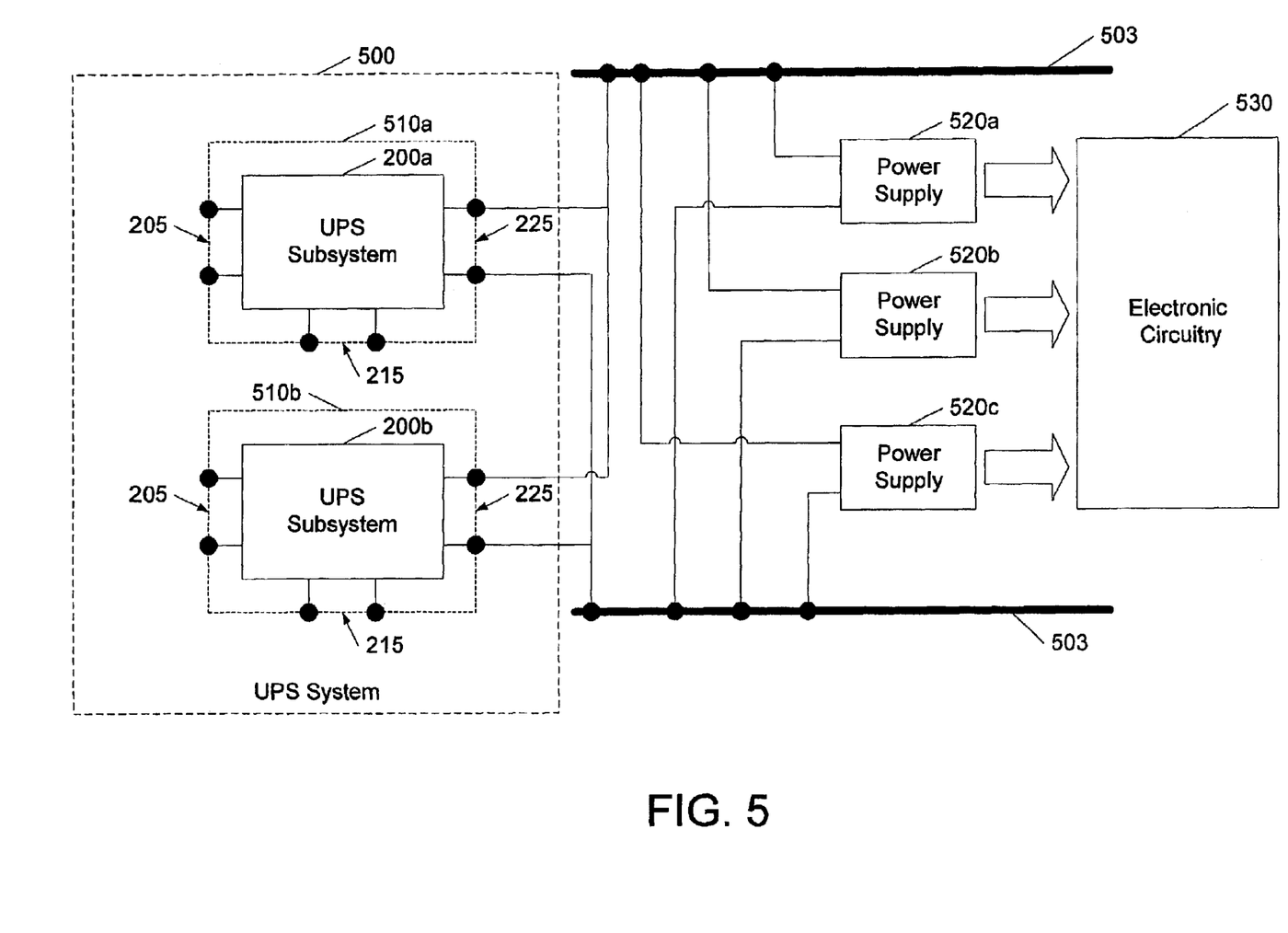
FIG. 5 is a schematic diagram illustrating a UPS system and methods utilizing multiple UPS subsystems according to embodiments of the invention.

As shown in FIG. 5, a UPS system may include UPS subsystems 200a, 200b implemented in respective physically separable circuit assemblies (modules) 510a, 510b, e.g., printed circuit cards, circuit modules or the like, with AC input ports 205 connecting to an AC power bus (not shown), DC input ports 215 connecting to a DC power bus (not shown), and output ports 225 connecting to a load bus 503. A composite load on the load bus 503 may include AC loads that are capable of operation with a DC input voltage and which also may be physically separable circuit assemblies, for example, power supply assemblies 520a, 520b, 520b that generate various DC voltages for electronic circuitry 530 (e.g., computer and/or networking circuits).

Figure 6:
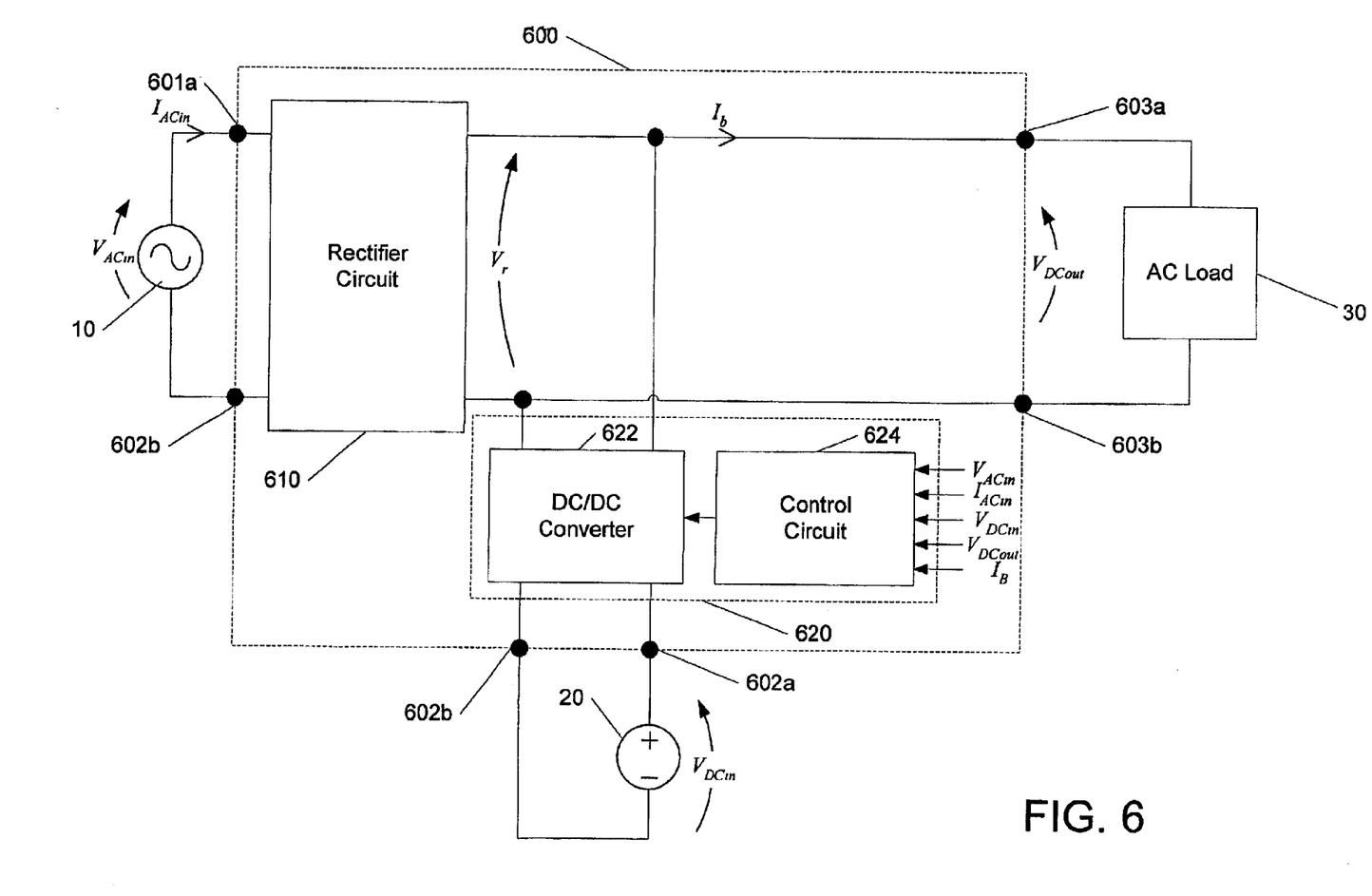
FIG. 6 is a schematic diagram illustrating a UPS system and methods utilizing a DC/DC converter circuit according to embodiments of the invention.

According to other aspects of the invention, a DC/DC converter can be used to provide standby power. Referring to FIG. 6, a UPS system 600 according to embodiments of the invention includes an AC input port 601a, 601b configured to be coupled to an AC power source 10, a DC input port 602a, 602b configured to be coupled to a DC power source 20, and an output port 603a, 603b configured to be coupled to an AC load 30. The system 600 includes a rectifier circuit 610 that is operative to produce a rectified voltage $V_r$ from an AC input voltage $V_{ACin}$ produced by the AC power source 10. A power transfer control circuit 620 is coupled to the DC input port 602a, 602b and to the rectifier circuit 610 and is operative to produce an output voltage $V_{DCout}$ at the output port 603a, 603b from the rectified voltage $V_r$ and/or a DC input voltage $V_{DCin}$ produced by the DC power source 20. As shown, the power transfer control circuit 620 includes a DC/DC converter circuit 622 that is operative to produce the DC voltage $V_{DCout}$ at the output port 603a, 603b from a DC voltage $V_{DCin}$ produced by the DC power source 20. The DC/DC converter circuit 622 operates under control of a control circuit 624 responsive to a control input such as the AC input voltage $V_{ACin}$, an AC input current $I_{ACin}$ at the AC input port 601a, 601b, the DC input voltage $V_{DCin}$, the DC output voltage $V_{DCout}$, or combinations thereof.

In embodiments of the invention, the inclusion of such DC/DC converter circuits may provide several advantages. In many applications, it may be desired to provide a DC output voltage $V_{DCout}$ of sufficient magnitude to serve relatively high voltage AC loads, e.g., a voltage sufficient to serve a 120 VAC or 240 VAC load. Use of a DC/DC converter circuit can allow for use of a relatively low voltage DC source, such as a 12-volt or 24-volt battery, to generate such a DC output voltage. This can be advantageous for several reasons. For example, if a given battery reserve energy is desired, it may be more cost-effective to use a high-capacity, low-voltage battery that provides this reserve, instead of a higher-voltage series combination of smaller batteries.

In addition, as many DC/DC converter designs provide galvanic isolation between input and output through the use of isolation transformers, galvanic isolation may be provided between the DC input port 602a, 602b and the DC output port 603a, 603b. This allows the use of a DC source that has an incompatible ground, such the positive grounded 48V power supplies commonly found in telecommunications installations. In a manner analogous to that described above with reference to FIGS. 3 and 4, DC/DC converter circuits of parallel-connected UPS subsystems having a configuration such as that illustrated in FIG. 7 may also be operated with output voltage vs. current characteristics that facilitate desirable load sharing when operating in a DC powered mode.

Figure 7:
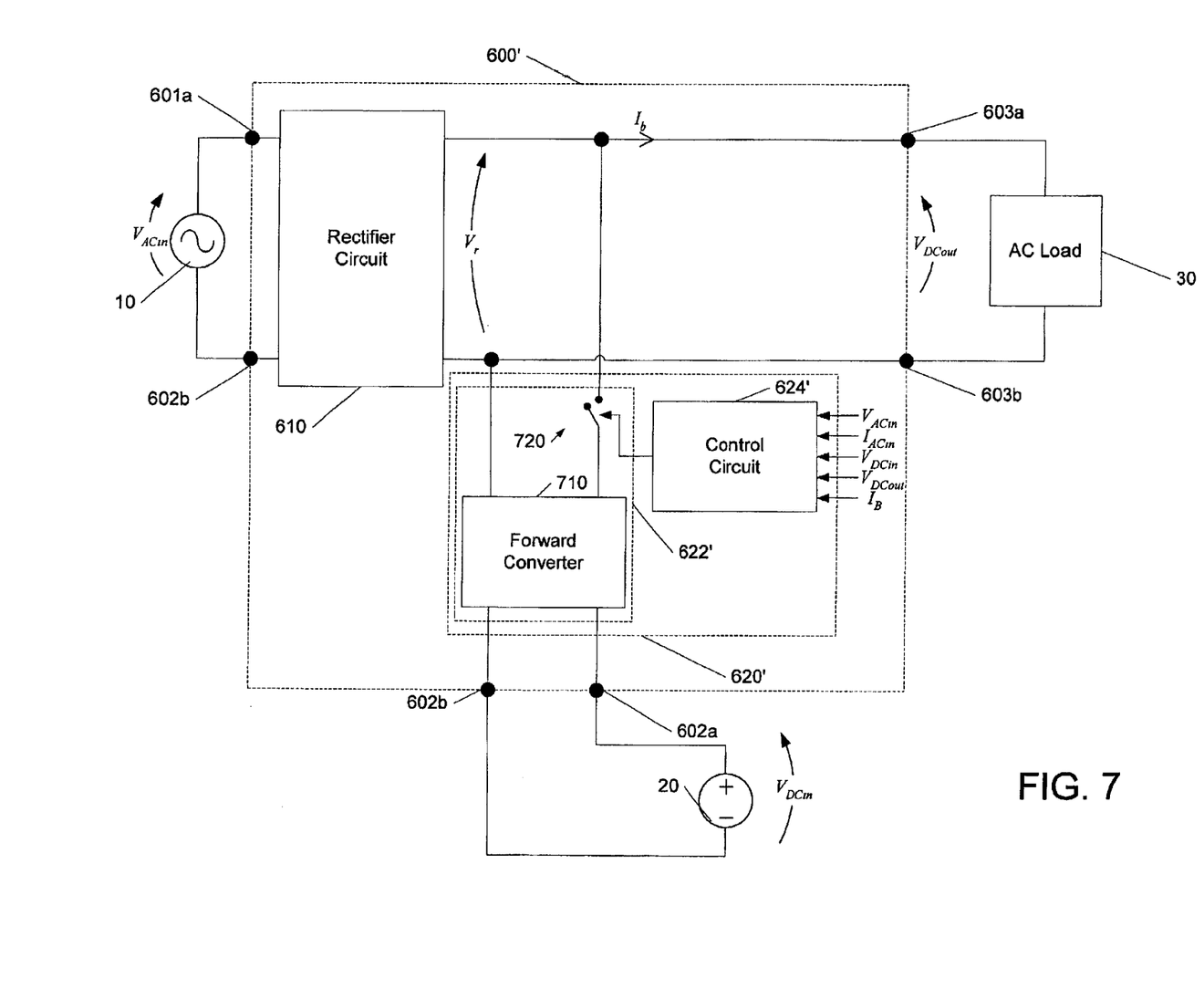
FIG. 7 is a schematic diagram illustrating a UPS subsystem and methods utilizing a DC/DC converter according to still other embodiments of the invention.

FIG. 7 illustrates a configuration for a UPS system 600' according to embodiments of the invention. Like components of the UPS system 600 and 600' of FIGS. 6 and 7 are indicated with like numerals, and further description of these like components will be omitted in light of the foregoing description of FIG. 6. The UPS system 600' includes a power transfer control circuit 620'. The power transfer control circuit 620' includes DC/DC converter circuit 622' that comprises a forward converter circuit 710 having an input that is coupled to the DC input port 602a, 602b and an output that is coupled to a switching circuit 720. The switching circuit 720 is operative to couple and decouple the forward converter circuit 710 under control of a control circuit 624'. The switching circuit 710 may include a variety of different devices that provide switching functionality, including, but not limited to, relays, transistors, diodes and silicon controlled rectifiers. For example, the switching circuit 710 may merely be a diode that diode OR's the output of the forward converter 710 with the output of the rectifier circuit 610.

Figure 8:
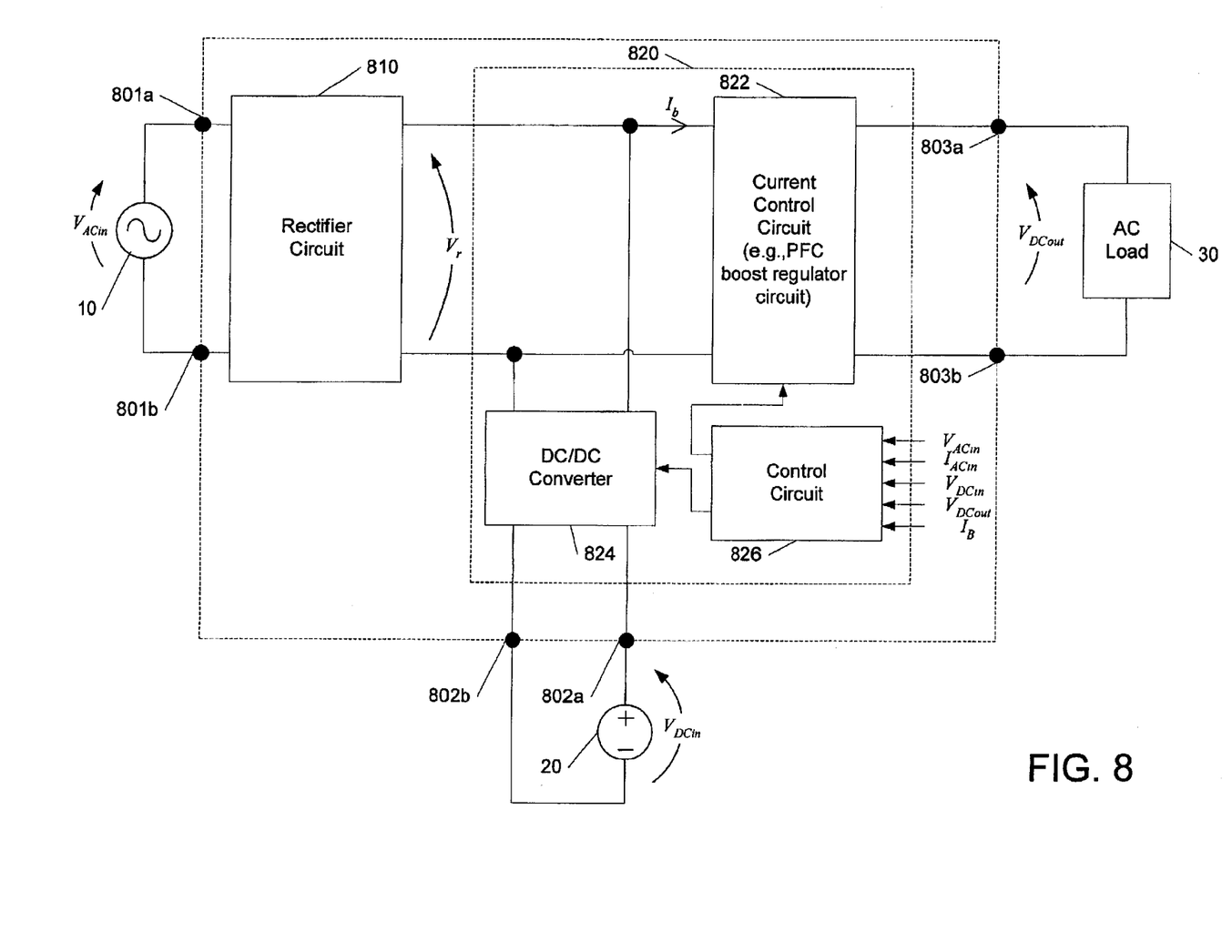
FIG. 8 is a schematic diagram illustrating a UPS system and methods utilizing a current control circuit and a DC/DC converter according to further embodiments of the invention.

According to other embodiments of the invention, current control circuits such as those illustrated in FIGS. 1–4 can be used in combination with the DC/DC conversion techniques such as illustrated in FIGS. 6 and 7 to achieve additional advantages. Referring to FIG. 8, a UPS system 800 according to embodiments of the invention includes an AC input port 801a, 801b configured to be coupled to an AC power source 10, a DC input port 802a, 802b configured to be connected to a DC power source 20, and an output port 803a, 803b configured to be connected to an AC load 30. The system 800 further includes a rectifier circuit 810 coupled to the AC input port 801a, 801b and operative to generate a rectified voltage $V_r$ from an AC input voltage $V_{ACin}$ at the AC input port 801a, 801b. A power transfer control circuit 820 includes a current control circuit 822 that is coupled to the output of the rectifier circuit 810 and that is operative to control a DC current therefrom responsive to a control input, e.g., under control of a control circuit 826 that is responsive to an input parameter such as the AC input voltage $V_{ACin}$, the AC input current $I_{ACin}$, the DC input voltage $V_{DCin}$, the DC output voltage $V_{DCout}$, or combinations thereof. The power transfer control circuit 820 further includes a DC/DC converter circuit 824 that is operative to generate the DC output voltage $V_{DCout}$ from a DC input voltage $V_{DCin}$ at the DC input port 802a, 802b under control of the control circuit 826. For example, the control circuit 826 may be operative to couple and decouple a forward or other type of DC/DC converter to and from the current control circuit 822, as described above with reference to FIG. 7.

The configuration in FIG. 8 can provide several advantages. The current control circuit 822 converter can provide power factor control and/or output voltage regulation as described above with reference to FIGS. 1–4. The DC/DC converter circuit 824 can further allow the use of a relatively low voltage DC power source 20 and can provide galvanic isolation, as described above with reference to FIGS. 6 and 7. Due to the regulation capability of the current control circuit 822, the DC/DC converter circuit 824, the DC/DC converter circuit 824 may be required to provide relatively little or no regulation and, therefore, maybe designed to achieve low complexity and/or high efficiency. For example, the DC/DC converter circuit 824 may include an open-loop forward converter having a fixed frequency and/or fixed duty cycle that reduces switching losses in comparison to a more complex, closed-loop converter that uses frequency and/or pulse width modulation (PWM) to achieve voltage regulation.

In the drawings and foregoing description thereof, there have been disclosed typical embodiments of the invention. Terms employed in the description are used in a generic and descriptive sense and not for purposes of limitation, the scope of the invention being set forth in the following claims.

What is claimed is:

1. An uninterruptible power supply (UPS) system, comprising:

an AC input port configured to be connected to an AC power source;

a DC input port configured to be connected to a DC power source;

an output port configured to be directly connected to an AC load;

a rectifier circuit coupled to the AC input port; and a power transfer control circuit coupled to the rectifier circuit, the DC input port and the output port, the power transfer control circuit operative to produce a DC voltage at the output port from a rectified voltage produced by the rectifier circuit in a first mode of operation and to produce a DC voltage at the output port from a DC voltage at the DC input port in a second mode of operation, the power transfer control circuit including:

a current control circuit configured to be coupled between the output port and at least one of the rectifier circuit and the DC input port and operative to control a current from the at least one of the rectifier circuit and the DC input port responsive to a control input; and a switching circuit operative to couple and decouple the DC input port to and from the output port.

2. A UPS system according to claim 1, wherein the current control circuit is operative to control a current at the AC input port responsive to the control input.

3. A UPS according to claim 2, wherein the current control circuit is operative to control at least one of a power factor and a harmonic current at the AC input port responsive to the control input.

4. A UPS system according to claim 3, wherein the current control circuit comprises a boost regulator circuit.

5. A UPS system according to claim 1, wherein the current control circuit is further operative to regulate a voltage at the output port responsive to the control input.

6. A UPS system according to claim 1, wherein the switching circuit is operative to decouple the DC input port from the current control circuit in the first mode of operation and to couple the DC input port to the current control circuit in the second mode of operation.

7. A UPS according to claim 6, wherein the current control circuit is operative to generate a boosted DC voltage at the output port from a DC voltage at the DC input port in the second mode of operation.

8. A UPS system according to claim 1, wherein the power transfer control circuit further comprises a DC/DC converter circuit coupled between the DC input port and the output port.

9. A UPS system according to claim 8, wherein the DC/DC converter circuit is operative to generate a boosted DC voltage at the output port from a DC voltage at the DC input port in the second mode of operation.

10. A UPS system according to claim 8, wherein the DC/DC converter circuit provides galvanic isolation between the DC input port and the output port in the second mode of operation.

11. A UPS system according to claim 8, wherein the DC/DC converter circuit comprises an open-loop converter.

12. A UPS system according to claim 8, wherein the DC/DC converter circuit comprises a forward converter.

13. A UPS system according to claim 1, further comprising a DC power source connected to the DC input port.

14. A UPS system according to claim 1 in combination with an AC load coupled to the output port.

15. A UPS system according to claim 1, wherein the control input comprises at least one of a voltage at the AC input port, a current at the AC input port, a voltage at the DC input port, and a voltage at the output port.

16. An uninterruptible power supply (UPS) system, comprising:

an AC input port configured to be connected to an AC power source;

a DC input port configured to be connected to a DC power source;

an output port configured to be directly connected to an AC load;

a rectifier circuit coupled to the AC input port;

a switching circuit operative to couple the DC input port to the output port responsive to a first control input to apply a DC voltage to the AC load; and a power factor correction circuit configured to connect the rectifier circuit to the output port to apply a DC voltage to the AC load and operative to control a power factor at the AC input port responsive to a second control input.

17. A UPS system according to claim 16, wherein the switching circuit is operative to decouple the DC input port from the output port responsive to an AC voltage at the AC input port meeting a first predetermined criterion and wherein the switching circuit is operative to couple the DC input port to the output port when the AC voltage at the AC input port meets a second predetermined criterion.

18. A UPS system according to claim 16, wherein the switching circuit is operative to couple the DC input port to the output port via the power factor correction circuit.

19. A UPS system according to claim 18, wherein the power factor correction circuit is operative to generate a boosted DC voltage at the output port from a DC voltage at the DC input port.

20. A UPS system according to claim 16, further comprising a DC/DC converter circuit coupled between the DC input port and the switching circuit.

21. A UPS system according to claim 16, wherein the control input comprises at least one of a voltage at the AC input port, a current at the AC input port, a voltage at the DC input port, and a voltage at the output port.

22. An uninterruptible power supply (UPS) system, comprising:
an AC input port configured to be connected to an AC power source;
a DC input port configured to be connected to a DC power source;
an output port configured to be directly connected to an AC load;
a rectifier circuit having an input coupled to the AC input port and an output coupled to the output port;
a power transfer control circuit coupled to the rectifier circuit output, the DC input port and the output port, the power transfer control circuit operative to produce a DC voltage at the output port from a rectified voltage produced by the rectifier circuit in a first mode of operation and to produce a DC voltage at the output port from a DC voltage at the DC input port in a second mode of operation, the power transfer control circuit including a DC/DC converter circuit configured to be coupled between the DC input port and the output port.

23. A UPS system according to claim 22, wherein the power transfer control circuit comprises a switching circuit coupled to the DC/DC converter circuit and the output port, the switching circuit operative to couple and decouple the DC/DC converter circuit to and from the output port responsive to an AC voltage at the AC input port.

24. A UPS system according to claim 22, wherein the DC/DC converter circuit is operative to generate a boosted DC voltage from a DC voltage at the DC input port.

25. A UPS system according to claim 22, wherein the DC/DC converter circuit is operative to provide galvanic isolation between the DC input port and the output port while transferring power between the DC input port and the output port.

26. A UPS system according to claim 22, wherein the DC/DC converter circuit comprises an open-loop converter.

27. A UPS system according to claim 22, wherein the DC/DC converter circuit comprises a forward converter.

28. A UPS system according to claim 22, further comprising a current control circuit configured to be coupled between the output port and at least one of the rectifier circuit and the DC/DC converter circuit and operative to control a current from the at least one of the rectifier circuit and the DC/DC converter circuit responsive to a control input.

29. A UPS system according to claim 28, wherein the current control circuit comprises a power factor correction circuit.

30. A UPS system according to claim 22, further comprising a DC power source connected to the DC input port.

31. A UPS system according to claim 22 in combination with an AC load coupled to the output port.

32. A UPS system according to claim 22, wherein the control input comprises at least one of a voltage at the AC input port, a current at the AC input port, a voltage at the DC input port, and a voltage at the output port.

33. An uninterruptible power supply system, comprising:
a plurality of UPS subsystems, the UPS subsystems each comprising:
an AC input port;
a DC input port;
an output port configured to be directly connected to an AC load;
a rectifier circuit coupled to the AC input port; and
a power transfer control circuit coupled to the rectifier circuit, the DC input port and the output port, the power transfer control circuit operative to produce a DC voltage at the output port from a rectified voltage produced by the rectifier circuit in a first mode of operation and to produce a DC voltage at the output port from a DC voltage at the DC input port in a second mode of operation,
wherein the plurality of UPS subsystems are configured to be connected in common at their output ports to a load including at least one AC load.

34. A UPS system according to claim 33, wherein the power transfer control circuit comprises a current control circuit configured to be connected between the output port and at least one of the rectifier circuit and the DC input port and operative to control a current from the at least one of the rectifier circuit and the DC input port responsive to a control input.

35. A UPS system according to claim 34, wherein the respective current control circuits of the UPS subsystems are operative to control respective power factors at their respective AC input ports.

36. A UPS system according to claim 34, wherein the respective current control circuits comprise respective boost regulator circuits.

37. A UPS system according to claim 34, wherein the respective current control circuits are further operative to regulate voltages at the respective output ports.

38. A UPS system according to claim 34, wherein the current control circuits are operative to control current vs. voltage characteristics at the output ports to provide a desired current sharing among the UPS subsystems.

39. A UPS system according to claim 34, wherein the respective power transfer control circuits comprise respective switching circuits operative to decouple the respective DC input ports from the respective current control circuits in the first mode of operation and to couple the respective DC input ports to the respective current control circuits in the second mode of operation.

40. A UPS system according to claim 34, wherein the control input comprises at least one of a voltage at the AC input port, a current at the AC input port, a voltage at the DC input port and a voltage at the output port.

41. A UPS system according to claim 33, wherein the UPS subsystems have capacities sufficient to provide redundant power supply service to the load.

42. A UPS system according to claim 41, wherein the UPS subsystems have capacities sufficient to provide N+1 redundancy.

43. A UPS system according to claim 33, wherein the power transfer control circuit comprises:
   a DC/DC converter circuit coupled to the DC input port; and
   a switching circuit operative to couple and decouple the DC/DC converter circuit to and from the output port.

44. A UPS system according to claim 33, wherein the DC/DC converter circuit provides galvanic isolation between the DC input port and the output port in the second mode of operation.

45. A UPS system according to claim 33, wherein the DC/DC converter circuit comprises an open-loop converter.

46. A UPS system according to claim 33, further comprising at least one DC power source connected to the DC input ports of the UPS subsystems.

47. A method of supplying power to an AC load, the method comprising:
   applying an AC voltage to a rectifier circuit to produce a rectified voltage;
   controlling a current from the rectifier circuit while producing a DC voltage at the AC load from the rectified voltage; and then
   coupling a DC power source to the AC load to produce a DC voltage at the AC load from the DC power source.

48. A method according to claim 47, further comprising the step of decoupling the DC power source from the AC load concurrent with the step of controlling a current from the rectifier circuit while producing an AC voltage at the AC load from the rectified voltage.

49. A method according to claim 48, wherein the step coupling a DC power source to the AC load to produce a DC voltage at the AC load comprising coupling the DC power source to the AC load responsive to the AC voltage meeting a predetermined criterion.

50. A method according to claim 47, wherein the step of controlling a current from the rectifier circuit while producing a DC voltage at the AC load from the rectified voltage comprises controlling at least one of a power factor and a harmonic current at an AC source producing the AC voltage.

51. A method according to claim 50, wherein the step of controlling a current from the rectifier circuit while producing a DC voltage at the AC load from the rectified voltage further comprises regulating the DC voltage produced at the AC load from the rectified voltage.

52. A method according to claim 47, wherein the step of controlling a current from the rectifier circuit while producing a DC voltage at the AC load from the rectified voltage comprises regulating the DC voltage produced at the AC load from the rectified voltage.

53. A method according to claim 47, further comprising controlling a current from the DC power source while producing the DC voltage at the AC load from the DC power source.

54. A method according to claim 53, wherein the step of controlling a current from the DC power source while producing the DC voltage at the AC load from the DC power source comprises regulating the DC voltage produced at the AC load from the DC power source.

55. A method according to claim 46, wherein the DC power source comprises a battery.

56. A method according to claim 47, further comprising the step of providing galvanic isolation between the DC power source and the AC load concurrent with the step of coupling the DC power source to the AC load to produce a DC voltage at the AC load from the DC power source.

57. A method of supplying power to an AC load, the method comprising:
   applying an AC voltage to a rectifier circuit to produce a rectified voltage;
   applying a DC voltage to a DC/DC converter circuit to produce a converted DC voltage;
   producing a DC voltage at the AC load from the rectified voltage; and then
   producing a DC voltage at the AC load from the converted DC voltage.

58. A method according to claim 57, wherein the step of applying a DC voltage to a DC/DC converter circuit comprises generating a boosted DC voltage from the applied DC voltage at the DC input port.

59. A method according to claim 57, further comprising providing galvanic isolation between the DC input port and the output port while transferring power between the DC input port and the output port.

60. A method according to claim 57, wherein the DC/DC converter circuit comprises an open-loop converter.

61. A method according to claim 57, wherein the DC/DC converter circuit comprises a forward converter.

62. A method according to claim 57, further comprising controlling a current from at least one of the rectifier circuit and the DC/DC converter circuit responsive to a control input.

63. A method according to claim 62, wherein the control input comprises at least one of a voltage at the AC input port, a current at the AC input port, a voltage at the DC input port, and a voltage at the output port.

64. A method according to claim 57, further comprising controlling at least one of power factor and a harmonic current at the AC input port concurrent with the step of producing a DC voltage at the AC load from the rectified voltage.

* * * * *